United States Patent
Burkhard et al.

(10) Patent No.: US 6,926,373 B2
(45) Date of Patent: Aug. 9, 2005

(54) METHOD FOR IMPROVING THE CONTROLLING ACTION OF AN ABS

(75) Inventors: Dieter Burkhard, Bingen-Büdelheim (DE); Rüdiger Mahlo, Königstein (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/296,767

(22) PCT Filed: May 30, 2001

(86) PCT No.: PCT/EP01/06137
§ 371 (c)(1),
(2), (4) Date: Dec. 13, 2002

(87) PCT Pub. No.: WO01/96160
PCT Pub. Date: Dec. 20, 2001

(65) Prior Publication Data
US 2003/0137190 A1 Jul. 24, 2003

(30) Foreign Application Priority Data
Jun. 16, 2000 (DE) ......................... 100 50 866

(51) Int. Cl.⁷ ............................. B60T 8/66
(52) U.S. Cl. ..................... 303/158; 303/194
(58) Field of Search ............ 303/15, 20, 155, 303/172, 174, 175, 176, 184, 185, 189, 140, 158, 194; 701/71, 78

(56) References Cited

U.S. PATENT DOCUMENTS
6,041,277 A    3/2000   Batistic et al.

FOREIGN PATENT DOCUMENTS
| DE | 3610186 | 10/1987 |
| EP | 0341866 | 11/1989 |
| EP | 0441122 | 8/1991 |

*Primary Examiner*—Chris Schwartz
(74) *Attorney, Agent, or Firm*—Honigman Miller Schwartz and Cohn LLP

(57) ABSTRACT

To improve the control behavior of a brake system with anti-lock control (ABS) on the occurrence of road irregularities, a brief braking pressure reduction phase with a major braking pressure reduction on a wheel, followed by a high re-acceleration of the wheel, is interpreted as a road irregularity if the quotient of the duration of the braking pressure reduction and of the total duration of the pressure reduction phase multiplied by the re-acceleration of the wheel or the maximum value of the re-acceleration or if the acceleration variation or the maximum value of the acceleration variation exceeds predetermined limit values, and a braking pressure rise that is increased compared to the standard ABS control is caused as a result of detection of the road irregularity.

4 Claims, 2 Drawing Sheets

METHOD FOR IMPROVING THE CONTROLLING ACTION OF AN ABS

TECHNICAL FIELD

The present invention relates to a method for improving the control behavior of a brake system with anti-lock control on occurrence of road irregularities such as cross grooves, potholes, bumps, etc.

BACKGROUND OF THE INVENTION

It is known in the art that ABS control systems are activated in response to rough road sections or road irregularities that occur during a braking operation (partial braking) without or prior to the proper wheel lock pressure level being reached. First of all, this causes an unwanted braking pressure reduction the wheel concerned, followed by a pulsed or stepwise braking pressure re-increase and, consequently, unnecessary actuation of the brake valves connected to disturbing valve noises and reductions in comfort and, in certain situation, a loss in deceleration of the vehicle or a longer stopping distance. This is because the original braking pressure level is reached only with time delay in the braking pressure increase phase following the braking pressure reduction induced by the road irregularity.

DE 195 36 105 A1 discloses a method of improving the control behavior of an anti-lock system (ABS) due to a single road irregularity, wherein a road irregularity is inferred from the maximum wheel slip that occurs as a result of the road irregularity on the wheel concerned, and from the duration of pressure reduction until the re-acceleration of the wheel. When a single road irregularity is detected, the braking pressure on the wheel suffering from the single irregularity is re-increased until the wheel acceleration falls below a predetermined limit value.

In the event of a major reduction of the wheel contact force due to a bump or a road irregularity having similar effects, when the brake slip exceeds a predetermined limit value and lasts for a minimum period of time, it is further known from DE 195 30 902 A1 to produce the product of the maximum brake slip and the time period from the commencement of instability until the point of wheel reversal, i.e., the re-acceleration, and to raise the braking pressure increase gradient in the subsequent pressure increase phase if the product exceeds a limit value.

BRIEF SUMMARY OF THE INVENTION

An object of the present invention is to develop another measure of improving the control behavior when road irregularities occur in order to reliably preclude a loss in braking efficiency due to road irregularities in all situations.

It has shown that this object may be achieved by the method of the present invention, wherein the rotational behavior of the wheels is evaluated for anti-lock control and for detecting road irregularities when the anti-lock control sets in subsequent to a partial braking operation.

Some especially favorable embodiments of the present invention are described in the attached dependent claims. Thus, it has proven especially advantageous in some cases of application to assess the exceeding of a limit value (TH) according to the relation $$t_{reduction}/T \times A_{cc} > TH_1 \text{ or}$$

$$t_{reduction}/T \times A_{ccmax} > TH_2$$

to detect a road irregularity, where $t_{reduction}$ refers to the duration of pressure reduction, T refers to the duration of the pressure reduction phase, $A_{cc}$ to the re-acceleration of the wheel, and $A_{ccmax}$ to the maximum value of the re-acceleration.

The re-acceleration variation is decisive in another embodiment. In this case, the exceeding of a limit value is evaluated according to the relation $$A_{ccp}' > TH_3 \text{ or}$$

$$A_{ccpmax}' > TH_4$$

to detect a road irregularity, where $A_{ccp}'$ designates the re-acceleration variation of the wheel and $A_{ccpmax}'$ refers to the maximum value of the re-acceleration variation.

Further details, features, and possible applications of the present invention can be taken from the following description of an embodiment of this invention by way of the accompanying drawings.

DETAILED DESCRIPTION OF PREFERRED EMBODIMENTS

Figure 1:
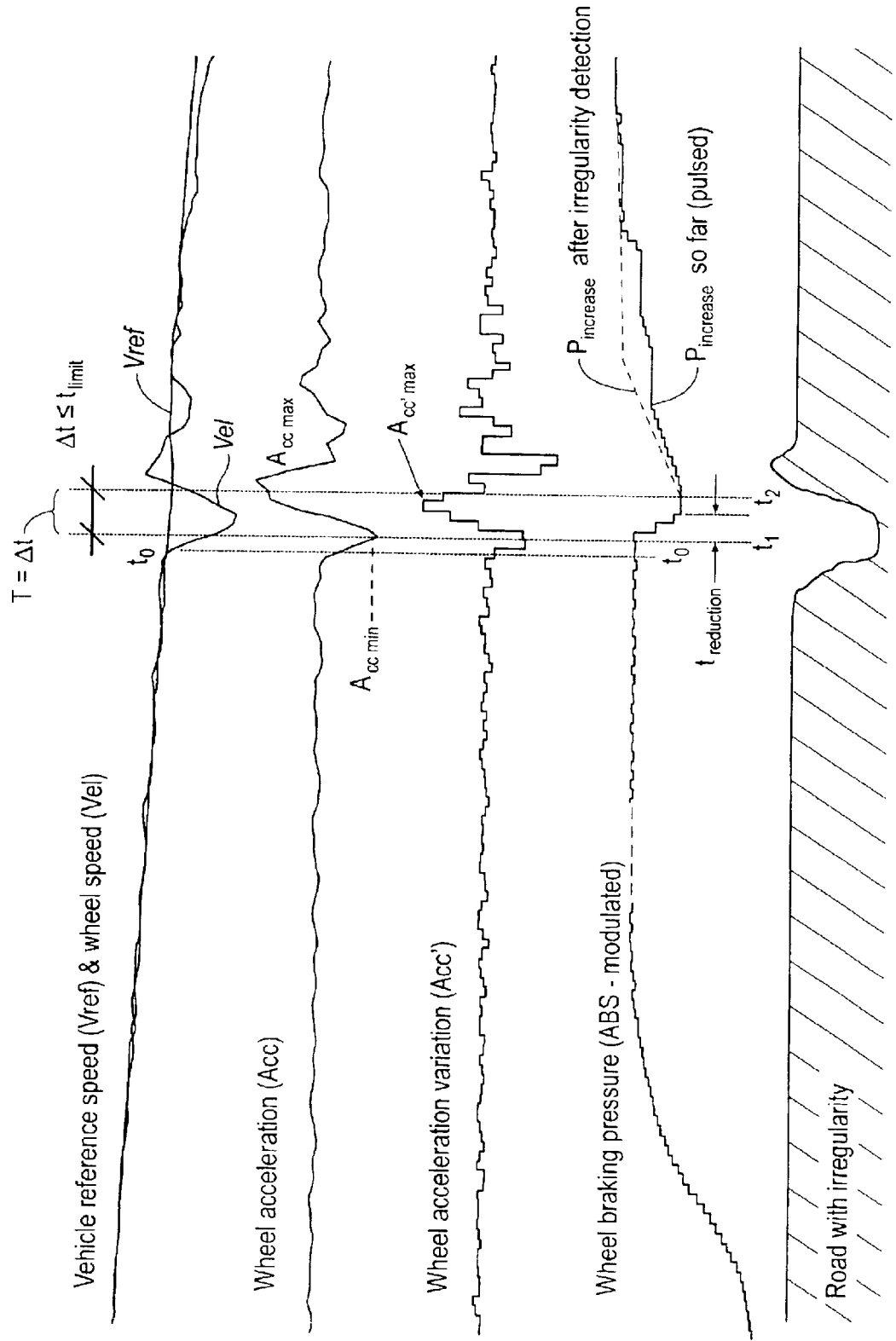
FIG. 1 is a chart showing the vehicle reference and wheel speed, the wheel acceleration, the wheel acceleration variation, and the variation of the wheel brake pressure in a braking operation where the method of the present invention is implemented.
Figure 2:
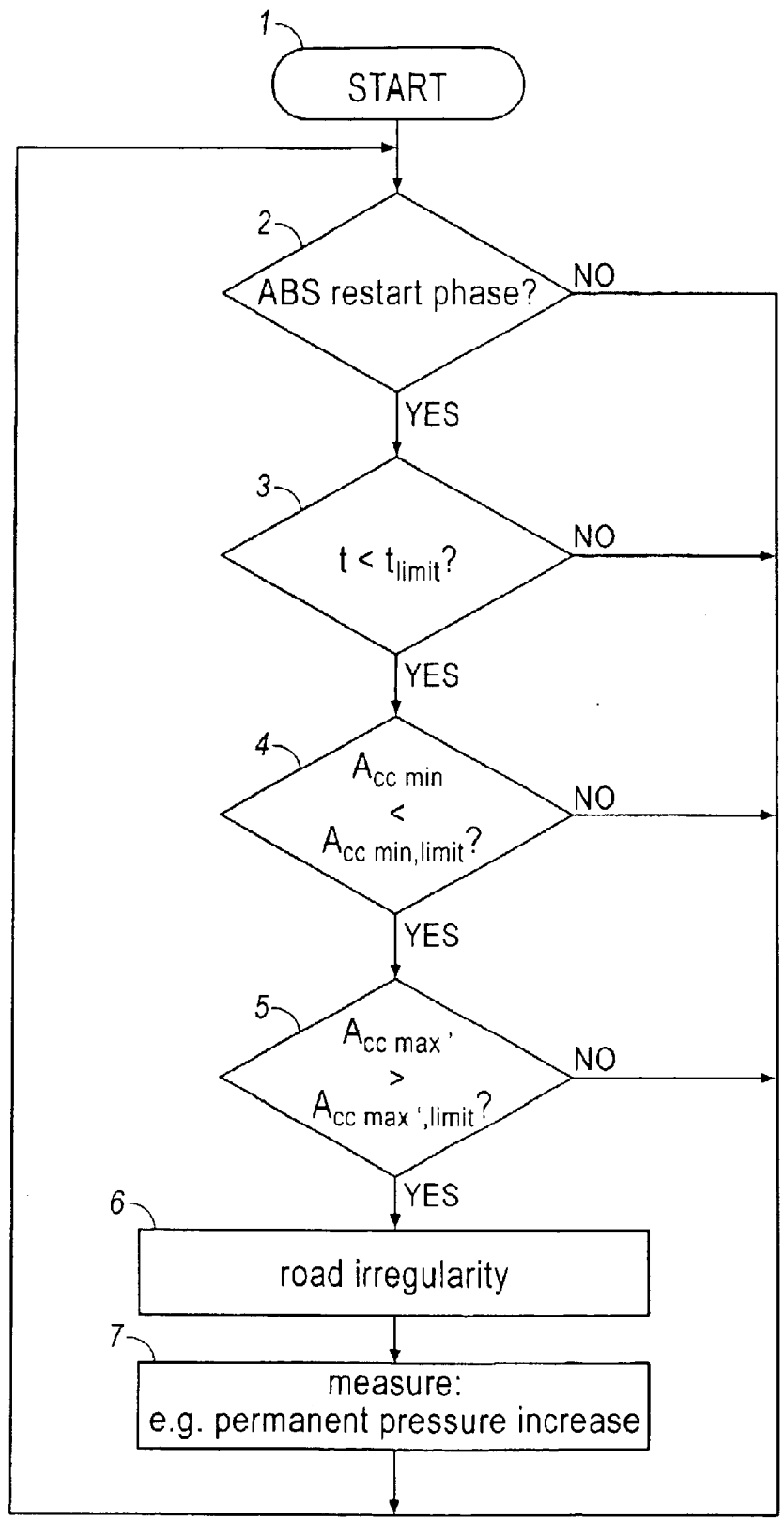
FIG. 2 is a flow chart showing the process of deciding for detecting a road irregularity, and the reaction thereto.

The following explanations with the aid of the diagrams and the flow chart according to FIGS. 1 and 2 relate to an arbitrary example of a road irregularity where the improvement of the control behavior achieved by the invention method is experienced. The road irregularity is a pothole in this case, as is indicated in the bottom line of FIG. 1.

The wheel behaves very similar in the event of an elevation, a bump, or an obstacle on the roadway. The characteristic deceleration followed by a high acceleration can again be observed. After detection of the obstacle, the method of the present invention reacts in the same way by a rapid pressure increase in order to compensate the braking pressure reduction evoked as a result of the road irregularity.

FIG. 1 depicts, over the same time scale or time span, respectively, the vehicle reference speed Vref (top curve: the roughly undisturbed characteristic curve), the wheel speed Vel, as well as the wheel acceleration Acc and the variation of the wheel acceleration Acc' (the so-called bounce) and, finally, the braking pressure variation on the wheel observed rolling over a pothole. The braking pressure variation in the 'normal mode' is shown as well as the rapid braking pressure re-increase (dotted characteristic curve) after the irregularity detection by means of the criteria evaluated according to the present invention.

As is shown in FIG. 1, the effects of a road irregularity, which is a pothole in this case, commence roughly at the time $t_0$. The vehicle reference speed which is produced by taking into account all vehicle wheels remains unaffected, while the speed variation Vel at the wheel concerned breaks and high wheel acceleration Acc and wheel acceleration variation Acc' can be recognized. In consequence of the high wheel acceleration Acc, anti-lock control commences at time $t_1$ or, respectively, the partial braking operation passes over into an ABS-controlled braking operation.

Thus, the road irregularity causes a braking pressure reduction phase starting approximately at the time $t_1$ and ending at the time $t_2$. According to a standard control mode, the braking pressure would be increased relatively slowly subsequent to $t_2$ until reaching the level predetermined by the driver's supply pressure or until the wheel lock pressure level. Such a variation is designated by '$P_{increase}$ so far (pulsed)' in the lowest characteristic curve. When a road irregularity is detected, however, the present invention arranges for the braking pressure to be raised again at an increased rate of velocity or with an increased gradient, as shows the dotted characteristic curve '$P_{increase}$ after irregularity detection', up to the predetermined level or the wheel lock pressure level.

To detect a road irregularity, the wheel course illustrated in FIG. 1 is analyzed according to the present invention. The wheel slip variations within the first pressure reduction phase, which are untypical of an ABS control, allow detecting a pattern of this wheel situation. At the point of time of the road irregularity (collision excitation), roughly at the time to according to FIG. 1, a friction value loss is encountered at the braked wheel, followed by a high, increasing wheel deceleration. This condition evokes a long dimensioned, initial pulse permitting unusually high wheel re-acceleration or maximum acceleration or, respectively, a variation of the acceleration per time unit. Besides, the short duration of the pressure reduction phase in the first control cycle is typical of a pothole or a pulse-like road irregularity.

The following measured variables and parameters are significant to detect a road irregularity and a control behavior caused by road irregularities:
Wheel acceleration $A_{cc}$; –Maximum wheel acceleration $A_{ccp}$ (or $A_{ccmax}$);
Variation of the wheel acceleration per time unit $A_{cc}'$;
Maximum value of the time variation of the wheel acceleration $A_{ccp}'$ (or $A_{ccmax}'$);
Length or duration of the pressure reduction phase T (or $\Delta t$);
The time $t_{reduction}$ duration or the number of the loops (in a clock-controlled system) where pressure reduction takes place (graphically represented in the embodiment of FIG. 1 by the duration of three reduction pulses);
Control commencement (start of the ABS-control);
Start of the pressure reduction on the wheel.

According to the present invention, a characteristic wheel course is identified according to the algorithms and conditions described hereinbelow to detect a roadway irregularity:

In a special embodiment of the present invention on the basis of an ABS control system with a control of the braking pressure variation by braking pressure increase and reduction pulses, the following conditions and criteria for detecting the road irregularity and influencing the pressure variation on the basis of the method of the invention are polled:
detection of the transition from a partial braking operation to anti-lock control (control commencement) 'short' pressure reduction phase on the wheel concerned;
the reduction phase in this example is shorter than roughly 40 ms, and
wheel re-acceleration in response to pressure reduction exceeds the limit value $TH_1$ or $TH_2$ according to the relation:

$$t_{reduction}/T \times A_{cc} > TH_1 \text{ or}$$

$$t_{reduction}/T \times A_{ccmax} > TH_2$$

or
variation with time of the wheel re-acceleration exceeds a limit value $TH_3$ or $TH_4$, respectively, according to the relation:

$$A_{ccp}' > TH_3 \text{ or}$$

$$A_{ccpmax}' > TH_4$$

Usually the above-mentioned time conditions are detected with the aid of counters being processed with a cycle of work ranging between 5 or 7 ms, for example.

FIG. 2 also serves to illustrate the method of the present invention, showing the sequence of steps and the logical combining of the individual conditions leading to detect road irregularities.

After start (1), it is found out in (2) that the partial braking operation has entered into anti-lock control:
the 'ABS reduction phase' commences. If the pressure reduction phase terminates after a duration t or, respectively, before a point of time $t_{limit}$ $$t < t_{limit}? \tag{3}$$

and if a high wheel deceleration $$A_{ccmin} < A_{ccmin\ limit}? \tag{4}$$

followed by a high re-acceleration $$A_{cc'max} > A_{cc'max\ limit}? \tag{5},$$

is determined, and predetermined limit values (TH) have been exceeded, finally the existence of a 'road irregularity' (6)

is identified which evokes a measure of

'permanent pressure increase' (7)

in contrast to the pulse-shaped pressure increase in the standard mode. This permits improving the control behavior, what is the objective of the present invention.

Thus, the wheel deceleration or (negative) acceleration of the monitored wheel '$A_{ccmin}$' is compared to the calculated limit value '$A_{ccmin.limit}$' in steps 4 and 5 of the program run in FIG. 2. When the (negative) acceleration '$A_{ccmin}$' is below this limit value ('yes' after step 4), another poll will be effected in the embodiment of FIG. 2 in order to detect whether the maximum value of the time variation of the acceleration $A_{ccmax}'$ in the phase of re-acceleration lies above the calculated limit value $A_{ccmax.limit}'$. In the affirmative, this will result in a detection of a road irregularity.

The implementation of the method of the invention is possible in different ways—depending on the rating and design of the control system. It is in any case decisive that
the duration of the pressure increase phase,
the duration of the pressure reduction which is induced by the rate of the wheel deceleration,
the wheel re-acceleration, the maximum wheel re-acceleration, or the time variation of the wheel re-acceleration, or the maximum value
is taken into account in the assessment. When the above-mentioned limit values are exceeded, this is very definitely an indicator that a road irregularity exists, and the effect of such irregularity on the control behavior is subsequently minimized or eliminated by an increased or accelerated pressure increase.

What is claimed is:
1. Method for improving the control behavior or a vehicle brake system with anti-lock control (ABS) or occurrence of road irregularities, comprising:
evaluating the rotational behavior of a plurality wheels for anti-lock control,
detecting road irregularities when the anti-lock control sets in subsequent to a partial braking operation, interpreting a brief pressure reduction phase, followed by a high re-acceleration of at least one of said plurality of wheels, as a road irregularity if $$t_{reduction}/T \times A_{cc} > TH_1 \text{ or}$$

$$t_{reduction}/T \times A_{ccmax} > TH_2, \text{ wherein}$$

$t_{reduction}$ refers to the duration of pressure reduction,

T refers to the duration of the pressure reduction phase, $A_{cc}$ refers to the re-acceleration of one of the vehicle's wheels, $A_{ccmax}$ refers to the maximum value of the re-acceleration, and where $TH_1$, $TH_2$ refer to the predetermined limit values increasing the rate of increase of a braking pressure compared to a standard rate of increase of braking pressure invoked under conditions where no road irregularities exist.

2. Method as claimed in claim 1, wherein a duration of the braking pressure reduction phase which is less than the predetermined limit value in the order of 20–100 ms, is interpreted as an indicator of a road irregularity.

3. Method as claimed in claim 1, wherein a duration of the braking pressure reduction phase which is less than the predetermined limit value in the order of 30–50 ms, is interpreted as an indicator of a road irregularity.

4. Method as claimed in claim 1, wherein interpreting a brief pressure reduction phase, followed by a high re-acceleration of the wheel, is also interpreted as a road irregularity if:

$$A_{ccp}' > TH_3 \text{ or}$$

$$A_{ccpmax}' > TH_4, \text{ wherein}$$

$A_{ccp}'$ refers to the re-acceleration variation of the wheel, $A_{ccpmax}'$ refers to the maximum value of the re-acceleration variation, and $TH_3$, $TH_4$ refer to the predetermined limit values.

* * * * *